United States Patent [19]

Sugawara et al.

[11] Patent Number: 5,039,008

[45] Date of Patent: Aug. 13, 1991

[54] AIR CONDITIONER

[75] Inventors: Sakuo Sugawara; Masanori Hara; Takane Suzuki; Yuka Maeda; Shigeki Onishi, all of Kamakura, Japan

[73] Assignee: Mitsubishi Denki Kabushiki Kaisha, Tokyo, Japan

[21] Appl. No.: 515,171

[22] Filed: Apr. 26, 1990

[30] Foreign Application Priority Data

May 10, 1989 [JP] Japan .................................. 1-116702
May 15, 1989 [JP] Japan .................................. 1-121260
Aug. 18, 1989 [JP] Japan .................................. 1-212345

[51] Int. Cl.$^5$ .......................... F24F 7/00; F25D 17/04
[52] U.S. Cl. .................................. 236/49.3; 236/1 B; 236/46 F; 62/186; 165/40; 98/40.25; 98/40.3
[58] Field of Search ................ 236/1 R, 1 B, 38, 49.3, 236/46 R, 46 F; 62/177, 186; 165/16, 40, 12; 98/40.25, 40.3, 42.09, 42.12

[56] References Cited

U.S. PATENT DOCUMENTS

| | | | |
|---|---|---|---|
| 4,615,481 | 10/1986 | Tanaami et al. | 165/40 X |
| 4,738,116 | 4/1988 | Himeno et al. | 62/186 |
| 4,875,624 | 10/1989 | Hara et al. | 236/49.3 |

FOREIGN PATENT DOCUMENTS

| | | |
|---|---|---|
| 123643A2 | 10/1984 | European Pat. Off. . |
| 2630504 | 4/1979 | Fed. Rep. of Germany . |
| 0184847 | 11/1982 | Japan .................................. 236/49.3 |
| 64-33452 | 2/1989 | Japan . |
| 2184867A | 7/1987 | United Kingdom . |
| 2190517A | 11/1987 | United Kingdom . |

Primary Examiner—Harry B. Tanner

[57] ABSTRACT

An air conditioner having an indoor unit placed in a room to be heated or cooled, and a draft directing apparatus, such as a vertically tilting louver, which can assume a first position directing an outlet draft toward the location where a user is normally positioned, e.g., downward, and a wecond position directing the output draft away from said location, e.g., upward. The draft directing apparatus is controlled to assume the first position and the second position alternately, in such a manner that the proportion of the time for which the draft directing apparatus is in the first position is adjusted in accordance with the detected temperature of the draft. This adjusts the proportion of the time the draft is directed toward the user, and it is therefore possible to adjust the stimulation affecting the user.

8 Claims, 14 Drawing Sheets

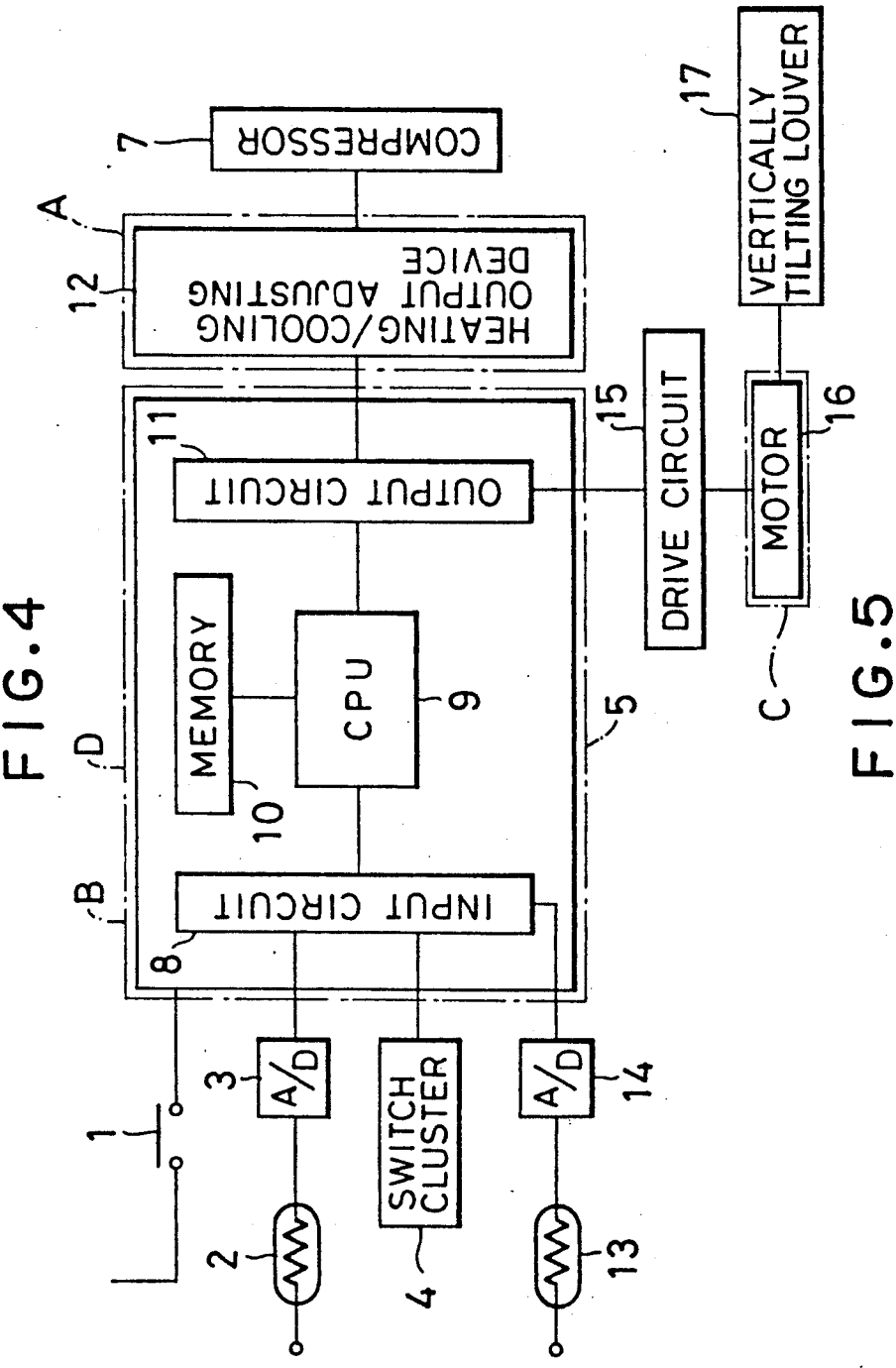
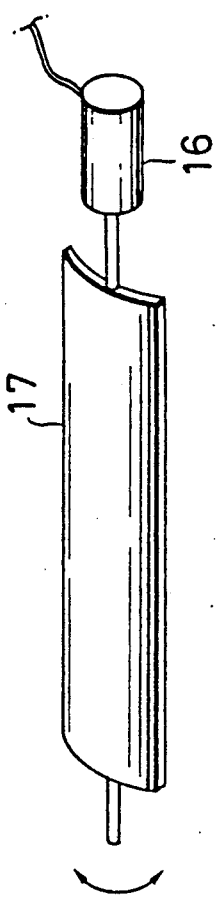

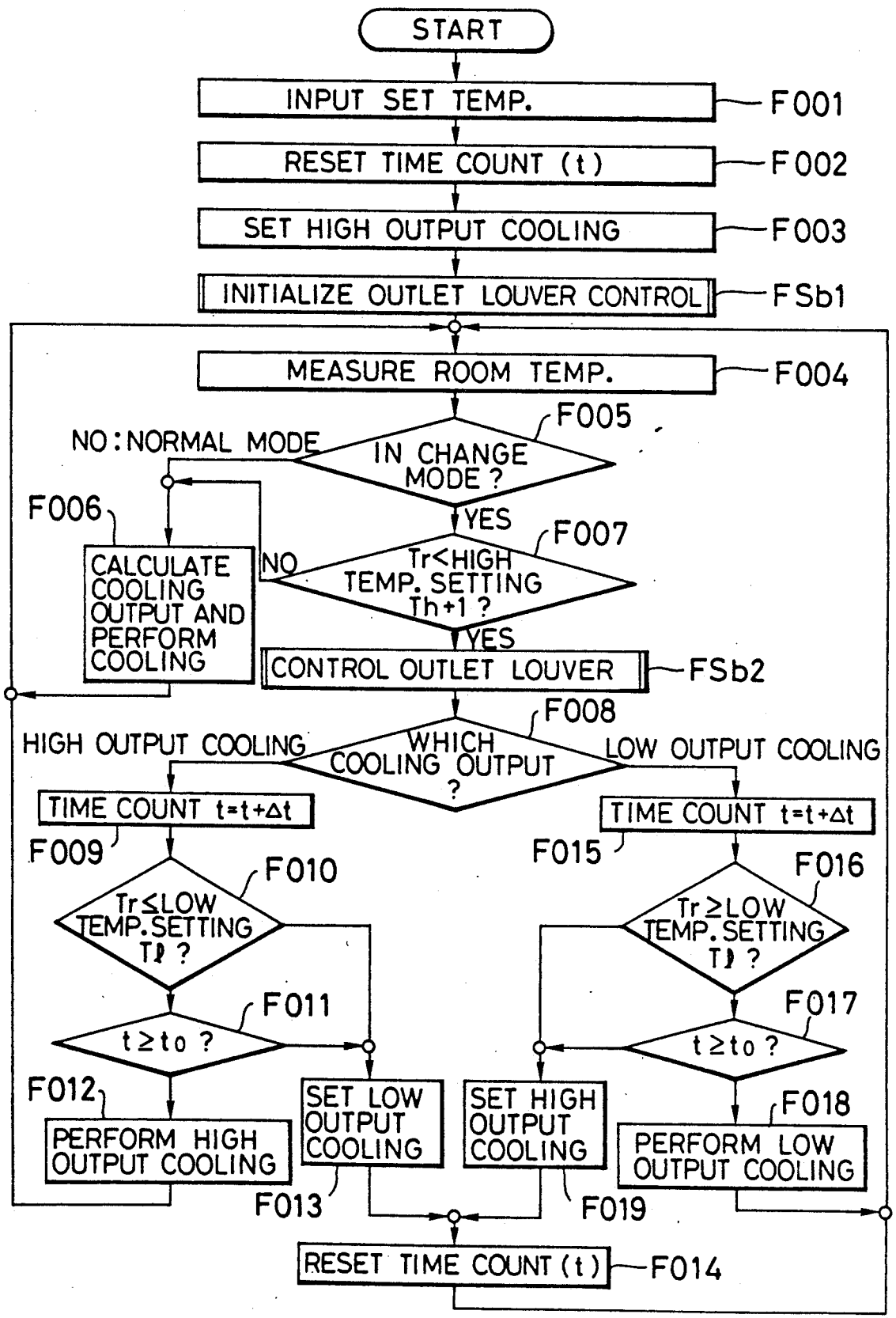

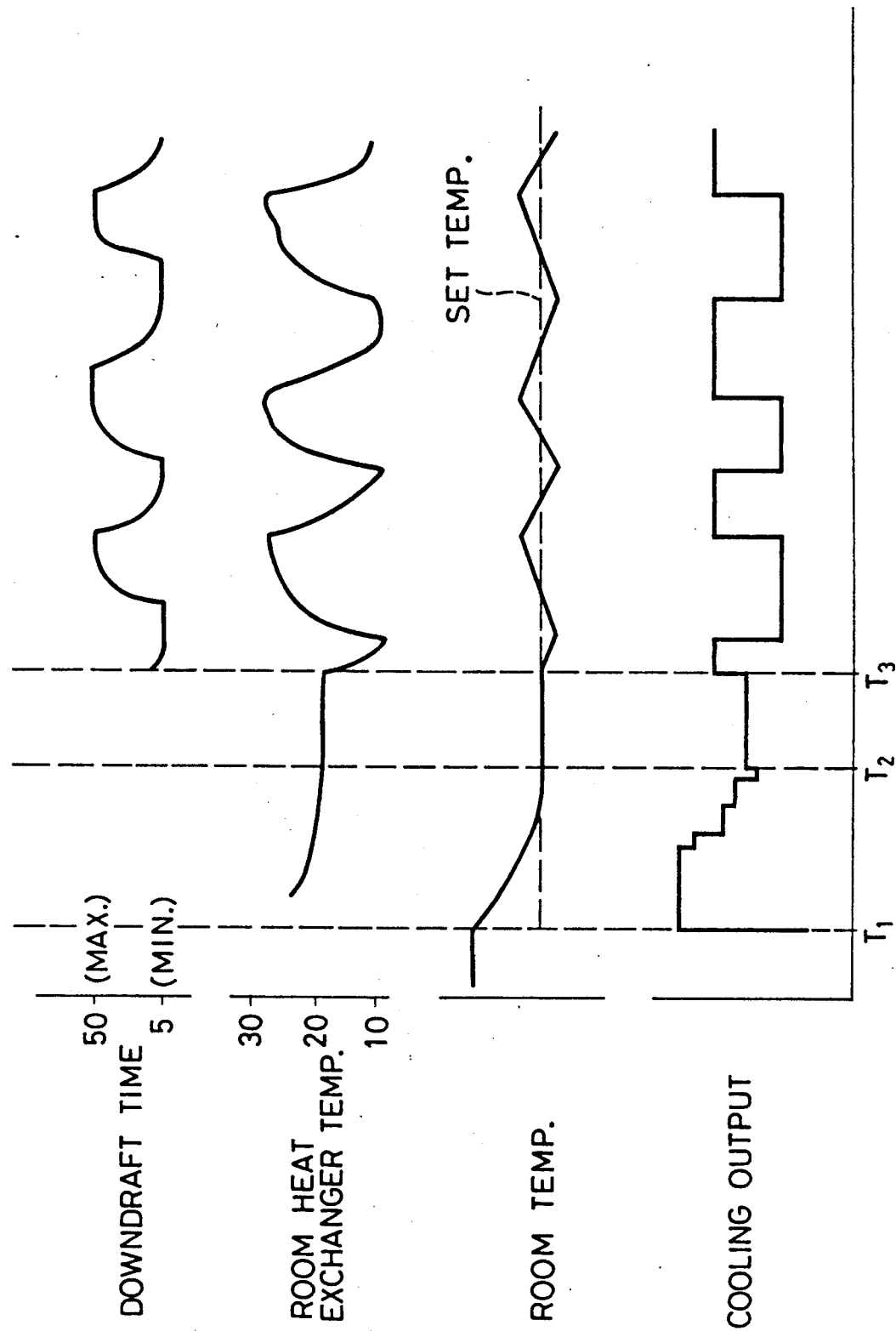

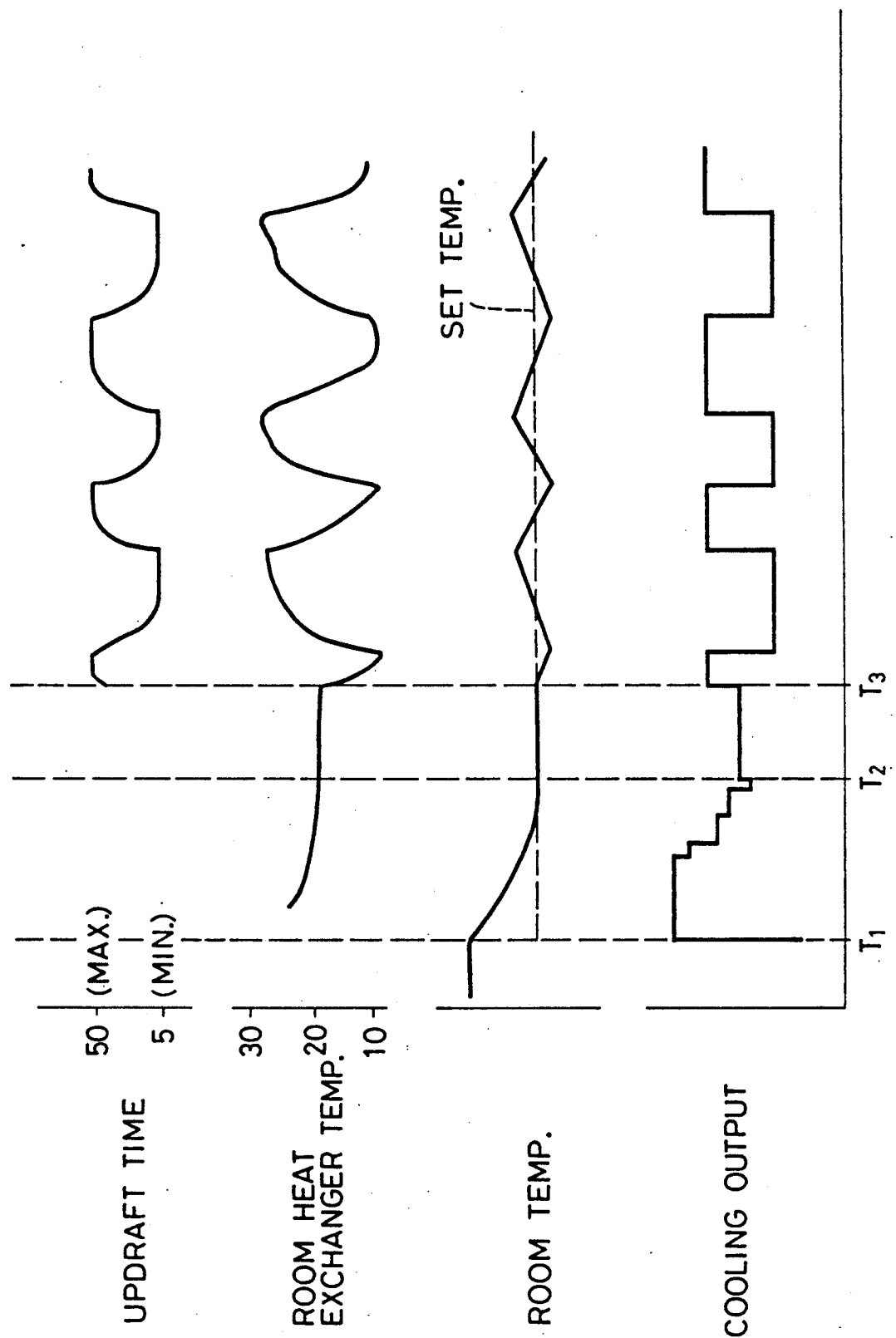

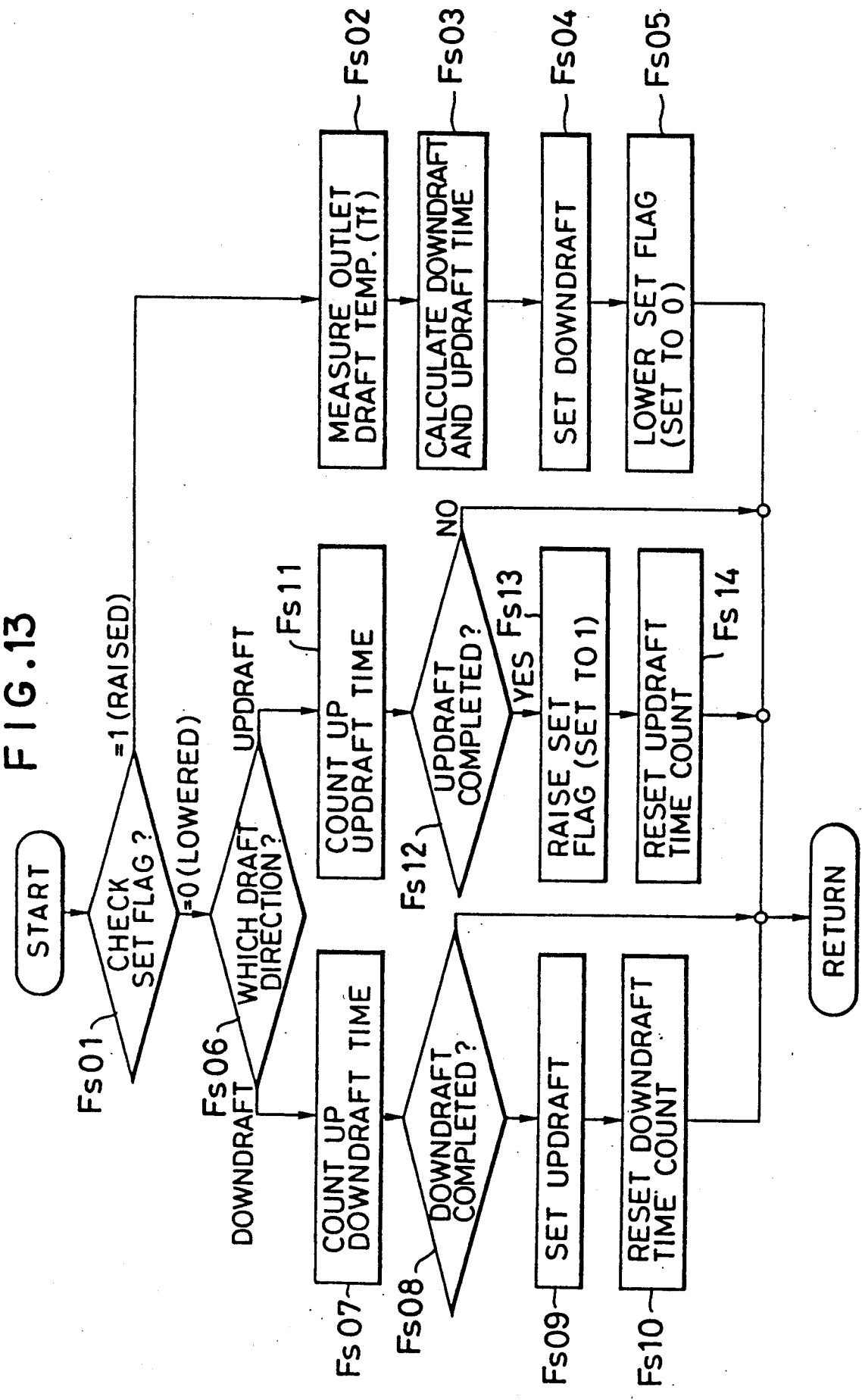

AIR CONDITIONER

BACKGROUND OF THE INVENTION

This invention relates to air conditioners.

FIG. 1 is an electric circuit diagram of a conventional air conditioner described in Japanese Patent Application No. 56956/1989 (hereafter referred to as the conventional art); and FIG. 2 is a flow chart showing the control of the action of this conventional art.

In FIG. 1, the numeral 1 denotes a power switch; 2 is a temperature detector that detects room temperature and is comprised of a thermistor or similar device; 3 indicates an A/D converter and 4 shows a switch cluster for selecting the operating mode and the like. The numeral 5 denotes a microcomputer, used as a means for calculating heating or cooling output, possessing a means for setting and/or changing the heating or cooling output, and comprising an input circuit 8, a CPU-9, a memory 10, and an output circuit 11. Switch setting signals for temperature, operating mode and the like which are output from switch cluster 4, together with temperature signals which are output from temperature detector 2 via A/D converter 3, are input into input circuit 8. A heating/cooling output adjusting device 12 regulates the rpm of compressor 7 through output from output circuit 11 to control the heating or cooling output.

The operation of the conventional art will now be described as related to cooling with reference to FIG. 2. FIG. 2 is a flow chart stored in microcomputer 5 containing the means for calculating heating or cooling output. Turning on power switch 1 starts the process flow. Next, at Step F101, the set temperature Ts is set. Steps F102 and F103 set initial settings for a change-mode: in Step F102, time count t is reset; in Step F103, high cooling output is set. In Step F104, room temperature Tr detected by temperature detector 2 is input. Should the normal-mode be found to have been selected at Step F105, then, at Step F106, the cooling output will be calculated from set temperature Ts and room temperature Tr; and operation will proceed accordingly. Should the change-mode be found to have been selected as the operating mode at Step F105, if, at Step F107, the room temperature is one or more degrees higher than a high temperature setting Th which is higher than the set temperature, operation will proceed the same as that of the normal-mode at Step F106. The reason for this is that, should the room temperature be much higher than the set temperature, the comfort range may sometimes not be reached. If the change-mode is found to have been selected for the operation mode, and if the room temperature is less than Th+1 (degree), flow will proceed to Step F108. At Step F108, a judgment will be made of cooling output: in the case of high output cooling, in which the heating or cooling output is, for example, 20% higher, processing will proceed to Step F109; in the case of low output cooling, in which the heating or cooling output is, for example, 20% lower than a present output, processing will proceed to Step F115. Since high output cooling was selected at the initial setting at Step F103 during the initialization of the change-mode, processing will proceed to Step F109. At Step F109, operating time is counted up. If at Step F110 room temperature Tr is higher than low temperature setting Tl, and if operating time t is less than a set time to, processing will proceed to Step F112, whereupon high output cooling will be performed. Processing will return to Step F104 and proceed from Step F104 to Step F109. The low temperature setting Tl is less than the set temperature. Therefore, as long as the room temperature Tr is higher than the low temperature setting Tl, and furthermore as long as operating time t is within a certain set time, the unit will continue to perform high output cooling. If room temperature Tr is less than or equal to the low temperature setting Tl, the program will branch to Step F113 at Step F110; if the operating time t is longer than a certain set time to, the program will branch to Step F113 at Step F111. At Step F113 low output cooling will be set, and at Step F114 the operating time count t will be reset. Processing will then return to Step F104. In such a case, since the operating mode is the change-mode and room temperature is less than Th+1, processing will proceed to Step F108 and, since low output cooling has been set, will continue to Step F115. At Step F115, operating time t is counted up. If at Step F116 room temperature Tr is lower than high temperature setting Th, and if operating time t is less than a set time to, processing will proceed to Step F118, whereupon low output cooling will be performed. Processing will then return to Step F104. Therefore, over a set time to, the room temperature Tr will repeatedly rise and fall in the range between the high temperature setting Th and the low temperature setting Tl, both of which are near the set temperature.

The prior art as described above seeks to create a pleasant environment by invigorating the physical and mental activity level of people by controlling heating or cooling output in such a way so as to keep room temperature within a set range near a set temperature. The level of this invigoration brought about by this form of control can be thought of as being determined by the amount of stimulation the environment gives to people. In the case of cooling, if the amount of stimulation is large, people begin feeling refreshed. This leads to an increase in comfort and energy-efficiency. However, the prior art has a problem in that, although the heating or cooling output changes, as does the temperature of the outlet draft, room temperature changes very slowly, making it difficult to obtain a large stimulus.

SUMMARY OF THE INVENTION

The invention seeks to eliminate problems such as described above and has as its object the creation of a pleasant and energy-efficient environment to invigorate the physical and mental activity of people by increasing, compared to control methods in which room temperature alone is changed, the stimulation of temperature receptors on the skin of a user by controlling room temperature in the vicinity of the set temperature and by controlling the outlet draft in such a way that the outlet draft comes in contact with the user, and, more specifically, by controlling the time for which the outlet draft is directed to the user.

An air conditioner according to the invention has an indoor unit placed in a room to be heated or cooled, containing:

a heating/cooling device that produces a heated or cooled air and that has an adjustable heating or cooling output;

a draft outlet through which the air heated or cooled at said heating device is passed out of the indoor unit;

a draft directing apparatus which can assume a first position directing an outlet draft toward the location where a user is normally staying and a second position directing the output draft away from said location;

a room temperature detector that detects the temperature within the room;

a draft temperature detector that detects the temperature of the draft;

an output control unit responsive to the detected room temperature for periodically varying the heating or cooling output of said heating/cooling device so that the room temperature is varied in the vicinity of a set temperature; and a draft direction control apparatus for controlling said draft directing apparatus to assume said first position and said second position alternately, and adjusting the proportion of the time for which said draft directing apparatus is in said first position, in accordance with the detected draft temperature.

The indoor unit is often positioned at the upper part of the room, and said draft directing may be a vertically tilting louver. In such a case, said first position is a position in which said vertically tilting louver is directing the draft downward.

The heating/cooling device may be a heat exchanger which is comprised of a refrigeration cycle.

The draft temperature may be detected at said draft outlet, or may be alternatively detected at said heating/cooling device.

The set temperature may be a temperature set by a user.

The direction control apparatus may adjust the time for which said draft directing apparatus is in said second direction in accordance with the temperature at said draft outlet, and maintains constant the time for which said draft directing apparatus is in said first direction.

The direction control apparatus alternatively adjust the time for which said draft directing apparatus is in said second direction in accordance with said detected draft time, and maintains constant the period with which the draft directing apparatus alternately assumes said first position and said second position.

An air conditioner of the configuration described above provides, in addition to a stimulus from varying a room temperature, a stimulus from varying an outlet draft of the air conditioner; and therefore, by this, is able to create a highly stimulating environment, i.e., an environment that is both pleasant and conducive to energy savings, by varying room temperature in the vicinity of a set temperature and by causing an outlet draft to occasionally come in contact with a user.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is an electrical circuit diagram for an air conditioner representing a first and second embodiment of the invention.

FIG. 5 shows a disassembled perspective view of a device for changing the direction of the draft.

FIG. 6 presents a flow chart for controlling the action of the first and second embodiment of the invention.

FIG. 9 shows control characteristics of the first embodiment.

FIG. 12 shows control characteristics of the second embodiment.

FIG. 13 displays a subroutine flow chart for Step Fsb2 of FIG. 6 in a third embodiment of the invention.

DETAILED DESCRIPTION OF THE PREFERRED EMBODIMENTS

Various embodiments of the invention will now be described with reference to the drawings.

Figure 1:
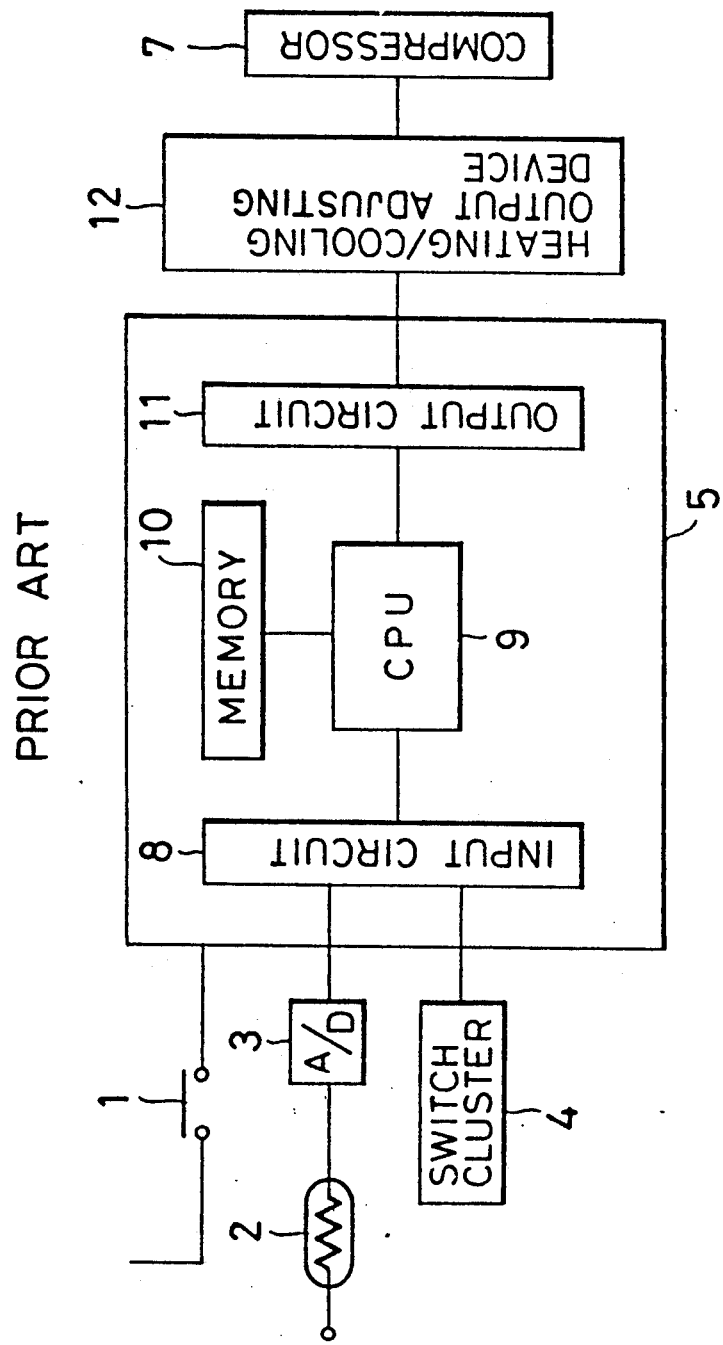
FIG. 1 is an electrical circuit diagram of a conventional air conditioner.

An air conditioner according to the invention is for conditioning, i.e., heating or cooling, the air in a confined space or a room. As schematically illustrated in FIG. 1, it includes a part, e.g., an indoor unit IU disposed inside the room RM having a draft outlet OL through which heated or cooled air flows into the room RM, and a part, i.e., an outdoor unit OU disposed outside the room RM. Heating/cooling devices, such as heat exchangers HX, are provided in the indoor unit IU and the outdoor unit OU. These heat exchangers form a refrigeration cycle.

The indoor unit is positioned for example in the upper part of the room RM. The indoor unit IU is provided with a draft directing means DR which can assume at least two positions. In the first position, it directs the draft of the air that has been conditioned, i.e., heated or cooled, toward the area or location where the user HU normally stays, for instance downward, as shown by arrows DD. In the second position, it directs the draft away from the above mentioned area, for instance upward, as shown by arrows UD. The draft directing means alternately assumes the first position and the second position. In the embodiments which will be described in detail, the draft directing means is a vertically tilting louver which is reciprocated between a first position and a second position.

The invention is featured by the control of proportion of the time for which the draft directing means is in the first position. This can be accomplished in various manners, as will be understood from the following description.

EMBODIMENT 1

A first embodiment will be now described in reference to FIG. 4 through FIG. 9.

Figure 7:
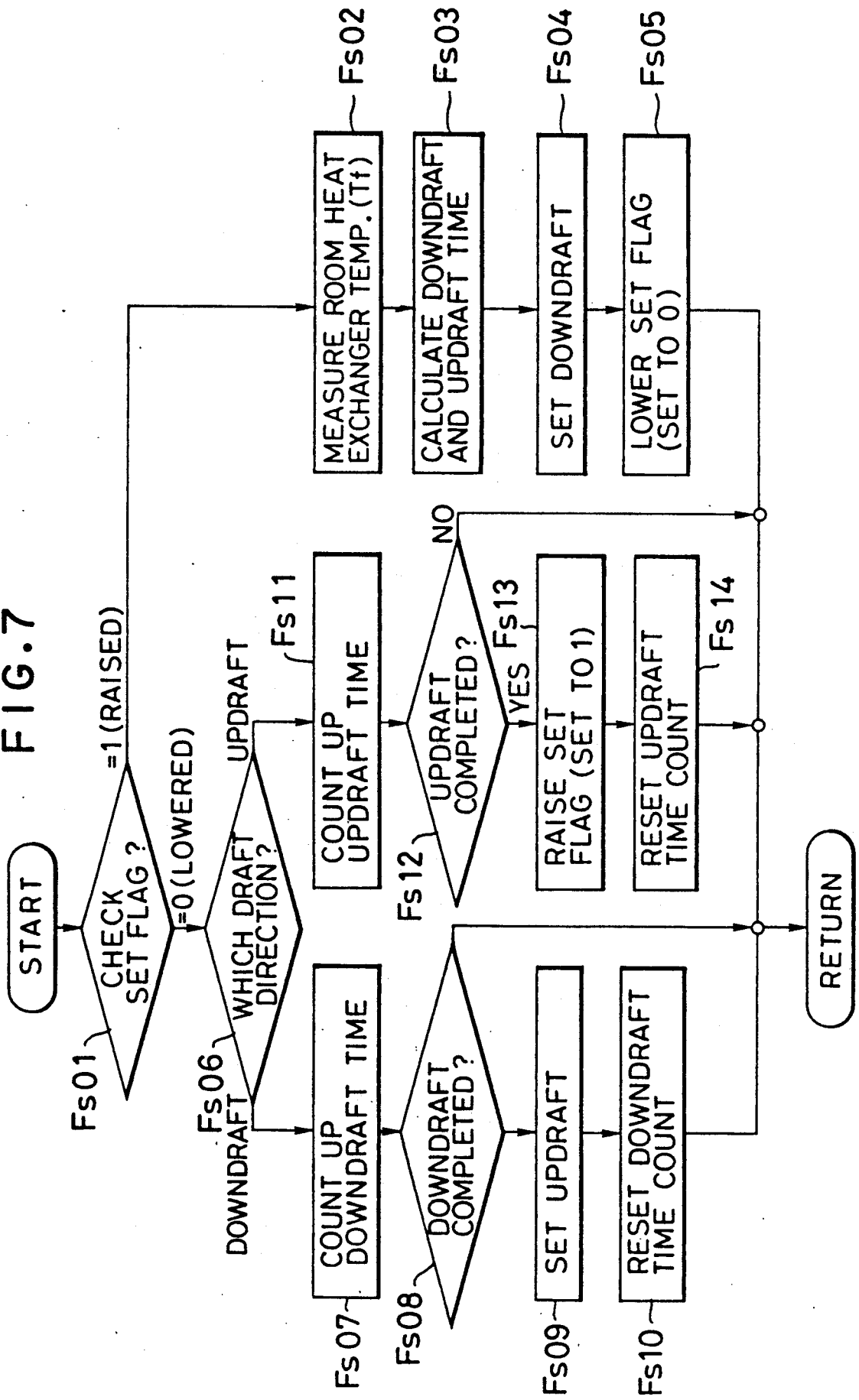
FIG. 7 displays a subroutine flow chart for Step Fsb2 of the first embodiment.
Figure 8:
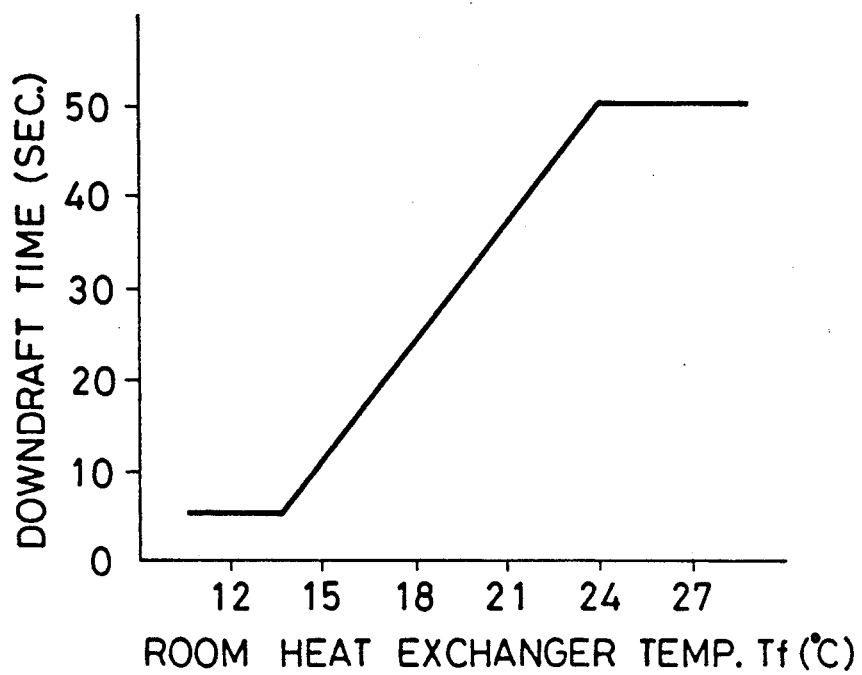
FIG. 8 diagrams, for the first embodiment, characteristics for room heat exchanger temperature and downdraft time.

FIG. 4 is an electrical circuit diagram for an air conditioner of a first embodiment of the invention, FIG. 5 shows a disassembled perspective view of a device for changing the direction of the draft, FIG. 6 presents a flow chart for controlling the action of the first embodiment of the invention, FIG. 7 displays a subroutine flow chart for Step Fsb2 of the first embodiment, FIG. 8 diagrams, for the first embodiment, characteristics for room heat exchanger temperature and downdraft time, and FIG. 9 shows control characteristics of the first embodiment.

In FIG. 4, the numeral 1 denotes a power switch; 2 is a room temperature detector that detects room temperature and is comprised of a thermistor or similar device; 3 indicates an A/D converter; 4 shows a switch cluster for selecting the operating mode and the like; the numeral 5 denotes a microcomputer used as a means B for calculating the heating or cooling output, possessing a means for setting and/or changing the heating or cooling output, and comprising an input circuit 8, a CPU 9, a memory 10, and an output circuit 11. Switch setting signals for temperature, operating mode and the like which are output from switch cluster 4, together with a room temperature signal which are output from room temperature detector 2 via A/D converter 3, are input into input circuit 8. To control the heating or cooling output, a heating/cooling output adjusting device 12 regulates the rpm of compressor 7 through an output from output circuit 11.

The above description is substantially unchanged from that of the conventional art. Below, the description will focus primarily on means for calculating the parameters defining the motion of a vertically tilting louver, which is a method of controlling outlet draft and a feature of the first embodiment. Numeral 13 indicates a draft temperature detector installed on a room heat exchanger HX of the indoor unit IU, and 14 shows an A/D converter. Numeral 15 represents a drive circuit which, in accordance with the output of output circuit 11, controls a motor 16 acting as a drive means C, such as a servo motor or similar device, attached to vertically tilting louver 17, for reciprocally driving vertically tilting louver 17 which changes the direction of an outlet draft.

A calculating means D comprises microcomputer 5 and calculates the parameters for defining the motion of the vertically tilting louver to vary, in accordance with the temperature of the room heat exchanger supplied from the draft temperature detector, the time that the draft is to flow downward from the outlet.

Figure 2:
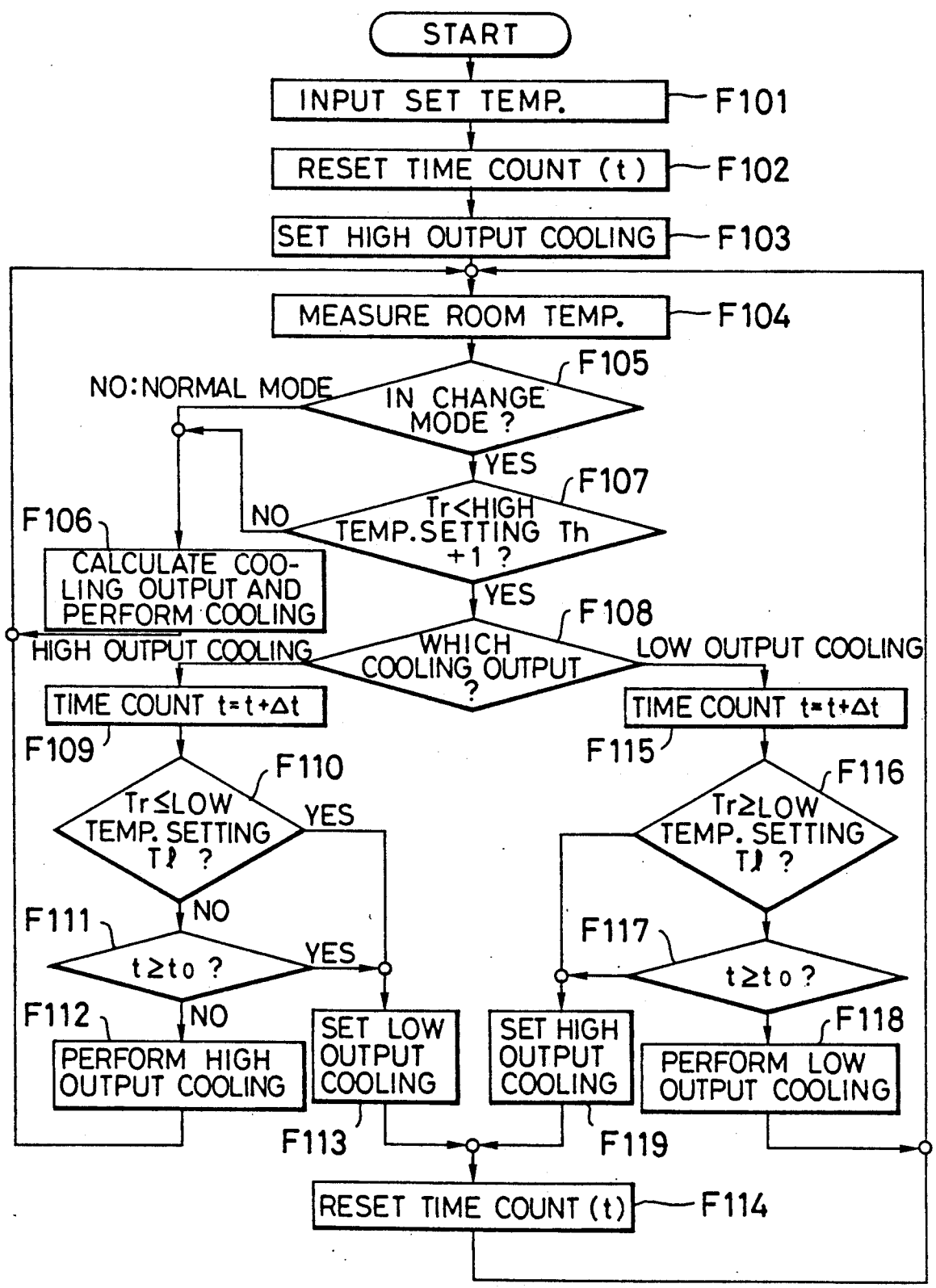
FIG. 2 is a flow chart illustrating the control of the action of a conventional air conditioner.
Figure 3:
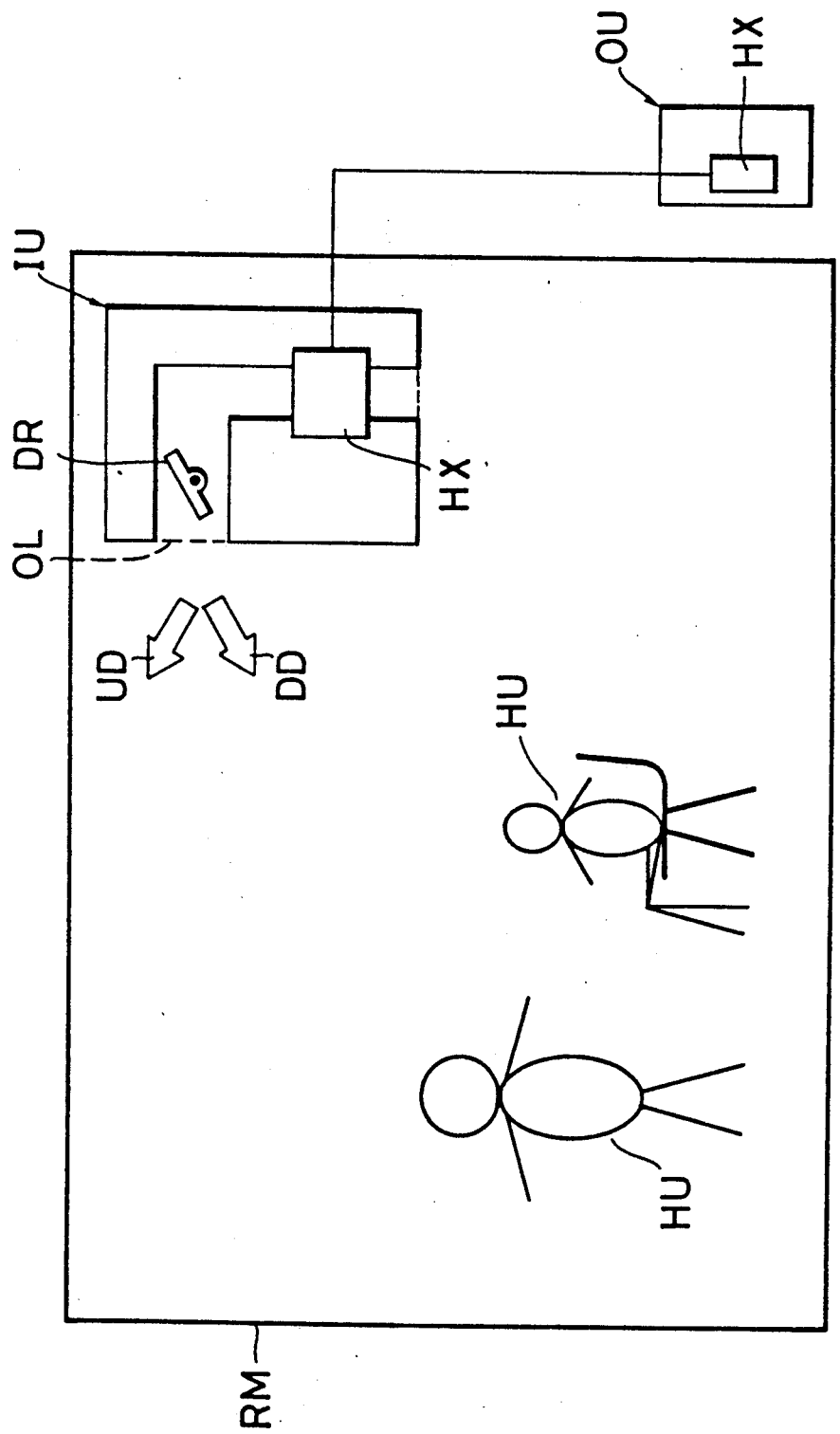
FIG. 3 is a schematic diagram showing the disposition of the air conditioner in a room, and the directions of the draft.

Taking cooling operation as an example, operation of the first embodiment will now be described in reference to FIG. 6 and FIG. 7. FIG. 6 and FIG. 7 are flow charts stored in microcomputer 5 which provides a means for calculating heating or cooling output. In FIG. 6, what is different from the conventional art flow chart (FIG. 2) is: Step Fsb1, a subroutine inserted between Step F003 and Step F004; and Fsb2, a subroutine inserted between Step F007 and Step F008. Step Fsb1 is an initialization set routine for Step Fsb2 and is not related to operation: it raises (sets to 1) a set flag, and resets a time for downdraft and updraft. With the exception of Step Fsb2, cooling output control accompanying room temperature control is the same as that of the conventional air conditioner and operates in the same manner. Specifically, turning on power switch 1 starts the process flow and, as a result, room temperature Tr is repetitively raised and lowered over a set time to between a high temperature setting Th and a low temperature setting Tl near a set temperature. One main feature of the invention is Step Fsb2; FIG. 7 shows a flow chart of that subroutine.

Subroutine Fsb2 will be explained in reference to FIG. 7 primarily with regards to the calculating means D for calculating the parameters defining the motion of the vertically tilting louver. In FIG. 7, when processing branches to the subroutine, the set flag will be checked at Step Fs01; and, if the flag is raised, i.e., if setting is necessary, processing will branch to Step Fs02; and, if the flag is not raised, i.e., if setting is not necessary, processing will branch to Step Fs06. Since the set flag was raised in the initialization set routine, at first processing will proceed to Step Fs02. At Step Fs02, room heat exchanger temperature Tf will be measured, and, at Step Fs03, a downdraft time shown in FIG. 8 will be calculated.

FIG. 8 is a characteristics chart for the room heat exchanger temperature and time the draft is flowing downward. As shown in FIG. 8, when the room heat exchanger temperature Tf is high, the downdraft time is long; and when the room heat exchanger temperature Tf is low, the downdraft time is short. A downdraft time corresponding to room heat exchanger temperature Tf at that time is calculated with this relation. Furthermore, under an assumption of a constant period, and updraft time is also calculated from the downdraft time. The figure shows a case in which the period is 55 seconds long.

In Step Fs04, an output of output circuit 11 (FIG. 4) of microcomputer 5 operates drive circuit 15 and motor 16, which rotate vertically tilting louver 17; thereby, setting the direction of the outlet draft downward. In Step Fs05, the set flag is lowered (set to 0); and processing returns to the main routine (FIG. 6). If the set flag is lowered by the time processing reaches Step Fs01 of FIG. 7, processing will proceed to Step Fs06. If at Step Fs06 draft direction is found to have been set to downward, the downdraft time will be counted up at step Fs07. Then, at Step Fs08, the downdraft time (set in Step Fs03) and the downdraft time count (counted up in Step Fs07) will be compared. If downdrafting is not yet complete (i.e., if the downdraft time count is less than the set downdraft time), processing will return to the main routine. If downdrafting is judged as complete at Step Fs08, processing will proceed to Step Fs09; and drive circuit 15 and motor 16 will operate by an output of output circuit 11 of microcomputer 5, and vertically tilting louver 17 will rotate; thereby, setting the direction of the outlet draft upward. In Step Fs10, the downdraft time count is reset; and processing returns to the main routine.

If, at Step Fs06, draft direction is found to have been been set to upward, processing will branch to Step Fs11; and, in a way similar to that for downdraft, an updraft time will be counted up. Then, at Step Fs12, an updraft time (calculated from room heat exchanger temperature Tf in Step Fs03) and the updraft time count will be compared. If updrafting is not yet complete, processing will return to the main routine. If updrafting is complete, the set flag will be raised (set to 1) at Step Fs13; at Step Fs14, the updraft time count will reset; and processing will return to the main routine.

In this way, the subroutine carries out, while maintaining constant the period with which the tilting louver is reciprocated, and in a repetitive manner, a downdraft operation and an updraft operation in accordance with a temperature of a room heat exchanger at that time.

FIG. 9 diagrams control characteristics under air conditioning for the first embodiment. The horizontal axis shows time; the vertical axes show cooling output, room temperature, room heat exchanger temperature, and downdraft time. Setting the operating mode to the normal-mode and starting to operate the air conditioner at time T1, room temperature will decrease toward a set temperature shown by a dotted line. Since cooling output is determined in accordance with the difference between the set temperature and the room temperature, the cooling output will decrease as the room temperature drops; and, at a time T2, the difference between the set temperature and the room temperature will become small and stabilize along with the cooling output. Should the change-mode be turned on at time T3, the cooling output will vary periodically as shown in the figure; thereby, influenced by room temperature and cooling output, the room heat exchanger temperature will vary as shown in the figure. By this, the room temperature will vary periodically near the set temperature. Conversely, should the change-mode turn on at time T3, the downdraft time will vary as shown in the graph due to the varying room heat exchanger temperature. As the downdraft time varies, a draft striking a user varies, which can be considered as a change in stimulation affecting the user. This stimulation can be considered as a function of draft temperature and the time the draft strikes the user. As the time the draft strikes the user increases, the stimulus affecting the user increases; also, as the draft temperature lowers, the stimulus affecting the user increases. The relation between room heat exchanger temperature and draft time shown in FIG. 8 seeks to equalize the degree of stimulation. Furthermore, the room heat exchanger temperature varies by cooling output, and the downdraft time varies by room heat exchanger temperature; therefore, to a user observing this variance in draft, the variance in draft is random and close to a natural breeze. A natural breeze is said to be pleasant. Stimulation from the change in room temperature and the change in draft pleasantly stimulates temperature receptors on the skin of a user and thereby invigorates physical and mental activity by creating an environment more pleasant and healthy compared to that created by a normal-mode which regulates room temperature to a constant value.

EMBODIMENT 2

Figure 11:
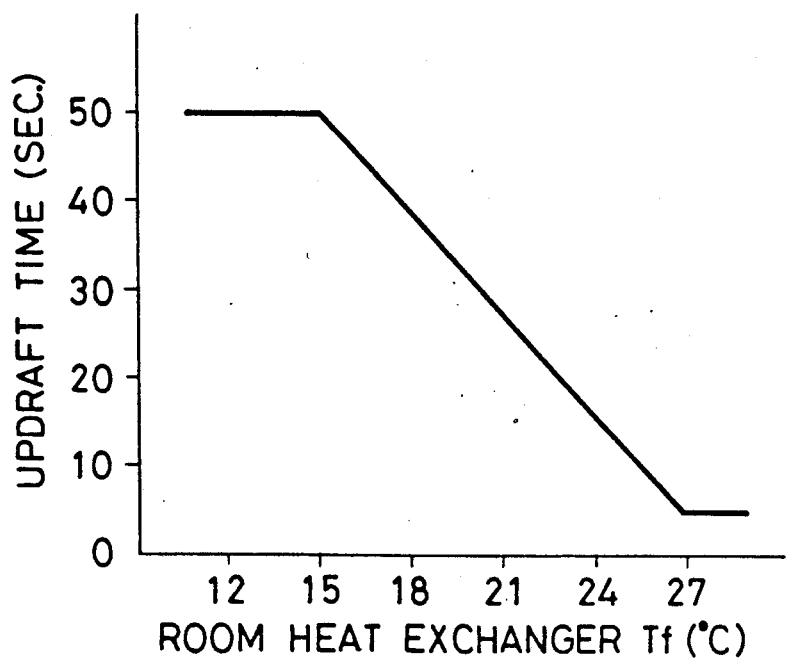
FIG. 11 diagrams, for the second embodiment, characteristics of room heat exchanger temperature and updraft time.
Figure 10:
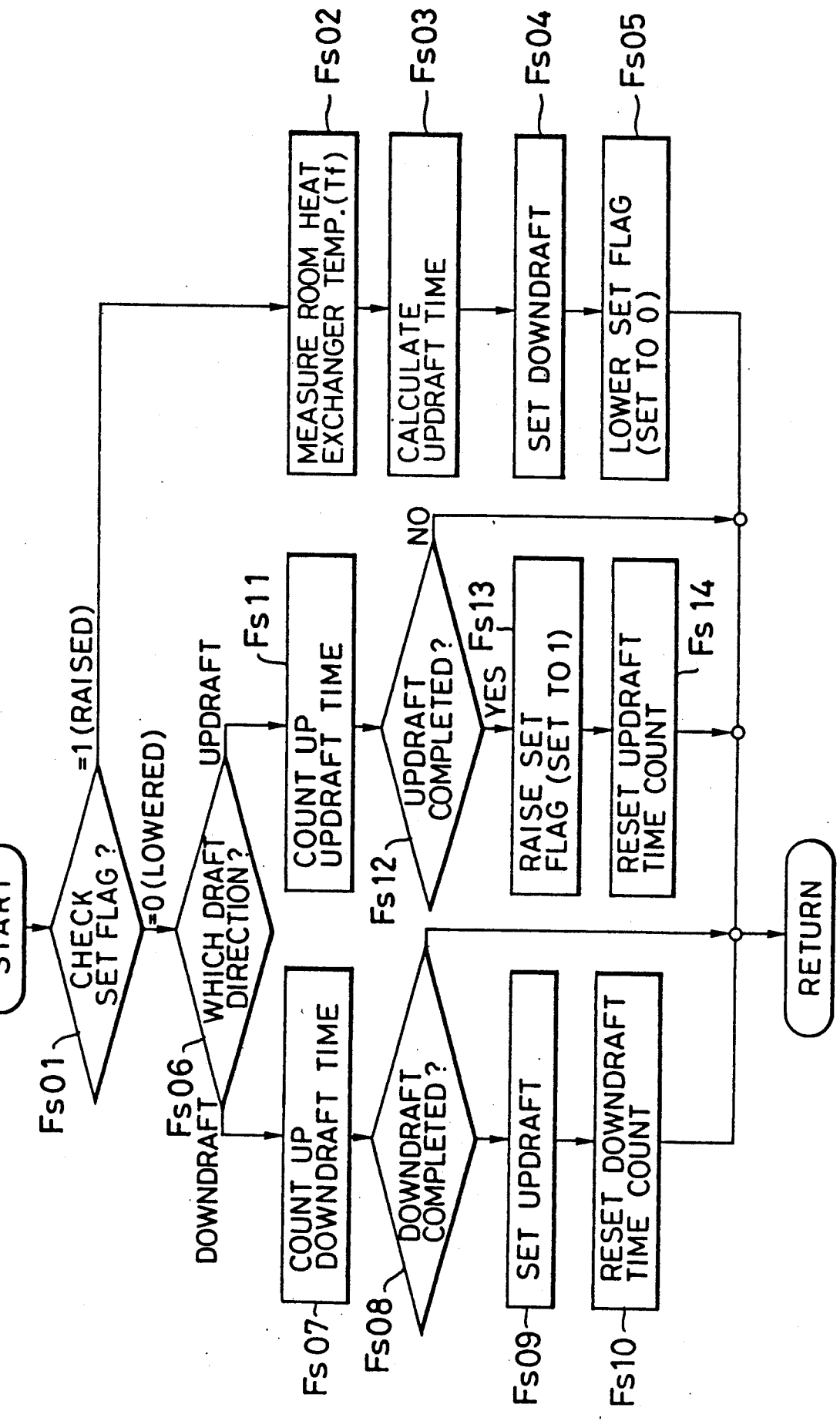
FIG. 10 displays a subroutine flow chart for Step Fsb2 of a second embodiment.

A second embodiment of the invention will now be described in reference to FIG. 4, FIG. 5, and FIG. 6 which were used for the description of Embodiment 1, as well as FIG. 10, FIG. 11, and FIG. 12. FIG. 10 displays a subroutine flow chart for Step Fsb2 of FIG. 6. FIG. 11 diagrams characteristics for room heat exchanger temperature and updraft time. FIG. 12 shows control characteristics of the second embodiment.

In this embodiment, the calculating means D differs from the calculating means D used in Embodiment 1 in that it calculates the parameters defining the motion of the vertically tilting louver to vary the time that a draft is flowing upward from on outlet in accordance with the temperature of the room heat exchanger, while keeping constant the cycle time that the draft is flowing downward from the outlet owing to an action of a vertically tilting louver.

Taking cooling operation as an example, operation of the second embodiment will now be described in reference to FIG. 6 and FIG. 10.

The operation for controlling the air conditioner is similar to that described in reference to FIG. 6 in connection with Embodiment 1 except for subroutine Fsb1 and subroutine Fsb2. In the subroutine Fsb1, a downdraft time is set, in addition to the raising of a set flag, and resetting of a time count for downdraft and updraft. The subroutine Fsb2 of this embodiment will be explained in reference to FIG. 10 primarily with regards to the calculating means D for calculating the parameters defining the motion of the vertically tilting louver. When processing branches to the subroutine, the set flag will be checked at Step Fs01; and, if the flag is raised, i.e., if setting is necessary, processing will branch to Step Fs02; and, if the flag is not raised, i.e., if setting is not necessary, processing will branch to Step Fs06. Since the set flag was raised in the initialization set routine, at first processing will proceed to Step Fs02. At Step Fs02, room heat exchanger temperature Tf will be measured, and, at Step Fs03, an updraft time shown in FIG. 11 will be calculated. FIG. 11 is a characteristics chart for the room heat exchanger temperature and updraft time. As shown in FIG. 11, when the room heat exchanger temperature Tf is high, the updraft time is short; and when the room heat exchanger temperature Tf is low, the updraft time is long. An updraft time corresponding to room heat exchanger temperature Tf at that time is calculated with this relation. In Step Fs04 of FIG. 10, an output of output circuit 11 of microcomputer 5 operates drive circuit 15 and motor 16, which rotate vertically tilting louver 17; thereby, setting the direction of the outlet draft downward. In Step Fs05, the set flag is lowered (reset to 0); and processing will return to the main routine. If the set flag has been lowered (reset to 0), then, at Step Fs01, processing will proceed to Step Fs06. If draft direction has been set to downward, the downdraft time will be counted up at step Fs07b. The downdraft time is set beforehand at the initialization set routine to a value of approximately 5 to 20 seconds. At Step Fs08, the set downdraft time and the downdraft time count (counted up in Step Fs07) will be compared. If downdrafting is not yet complete (i.e., if the set downdraft time is less than the downdraft time count), processing will return to the main routine. If downdrafting is judged as complete at Step Fs08, processing will proceed to Step Fs09; and drive circuit 15 and motor 16 will operate by an output of output circuit 11 of microcomputer 5, and vertically tilting louver 17 will rotate; thereby, setting the direction of the outlet draft downward. In Step Fs10, the downdraft time count is reset; and processing returns to the main routine. If draft direction has been set to upward, processing will branch to Step Fs11 at Step Fs06; and, in a way similar to that for downdraft, an updraft time will be counted up. Then, at Step Fs12, an updraft time (calculated from room heat exchanger temperature Tf Step Fs03) and the updraft time count will be compared. If updrafting is not yet complete, processing will return to the main routine. If updrafting is complete, the set flag will be raised (set to 1) at Step Fs13; at Step Fs14, the updraft time count will be reset; and processing will return to the main routine. In this way, the subroutine repetitively performs an updraft operation, in accordance with a temperature of a room heat exchanger at that time, and a downdraft operation, which is pre-set.

FIG. 12 diagrams control characteristics under air conditioning for the second embodiment. The horizontal axis shows time; the vertical axes show cooling output, room temperature, room heat exchanger temperature, and updraft time. Setting the operating mode to the normal-mode and starting to operate the air conditioner at time T1, room temperature will decrease toward a set temperature shown by a dotted line. Since cooling output is determined in accordance with the difference between the set temperature and the room temperature, the cooling output will decrease as the room temperature drops; and, at a time T2, the difference between the set temperature and the room temperature will become small and stabilize along with the cooling output. Should the change-mode be turned on at time T3, the cooling output will vary periodically as shown in the figure; thereby, influenced by room temperature and cooling output, the room heat exchanger temperature will vary as shown in the figure. By this, the room temperature will vary periodically near the set temperature. Conversely, should the change-mode turn on at time T3, the updraft time will vary as shown in the graph due to the varying room heat exchanger temperature. As the updraft time varies, a draft striking a user varies, which can be considered as a change in stimulation affecting the user. This stimulation can be considered as a function of time the draft strikes the user and draft temperature. As the time the draft strikes the user increases, the stimulus affecting the user increases; also, as the draft temperature lowers, the stimulus affecting the user increases. The relation between room heat exchanger temperature and draft time shown in FIG. 11 seeks to equalize the degree of stimulation. Stimulation from the change in room temperature and the change in draft pleasantly stimulates temperature receptors on the skin of a user and thereby invigorates physical and mental activity by creating an environment more pleasant and healthy compared to that created by a normal-mode which regulates room temperature to a constant value.

In the previous description of the first and second embodiments, a case having a selection switch for changing over between a normal-mode and a change-mode was discussed; however, processing may enter the change-mode at any time with no such switch.

Also, in the previous description of the first and second embodiments, a case was discussed in which processing enters the change-mode when room temperature is within a certain range near a set temperature; however, processing may be in the change-mode at all times.

Furthermore, in the previous description of the embodiment, a case of cooling was discussed; however, the same holds true for heating, and a similar effect may be obtained for heating with any air conditioner having an adjustable heating or cooling output.

EMBODIMENT 3

Figure 14:
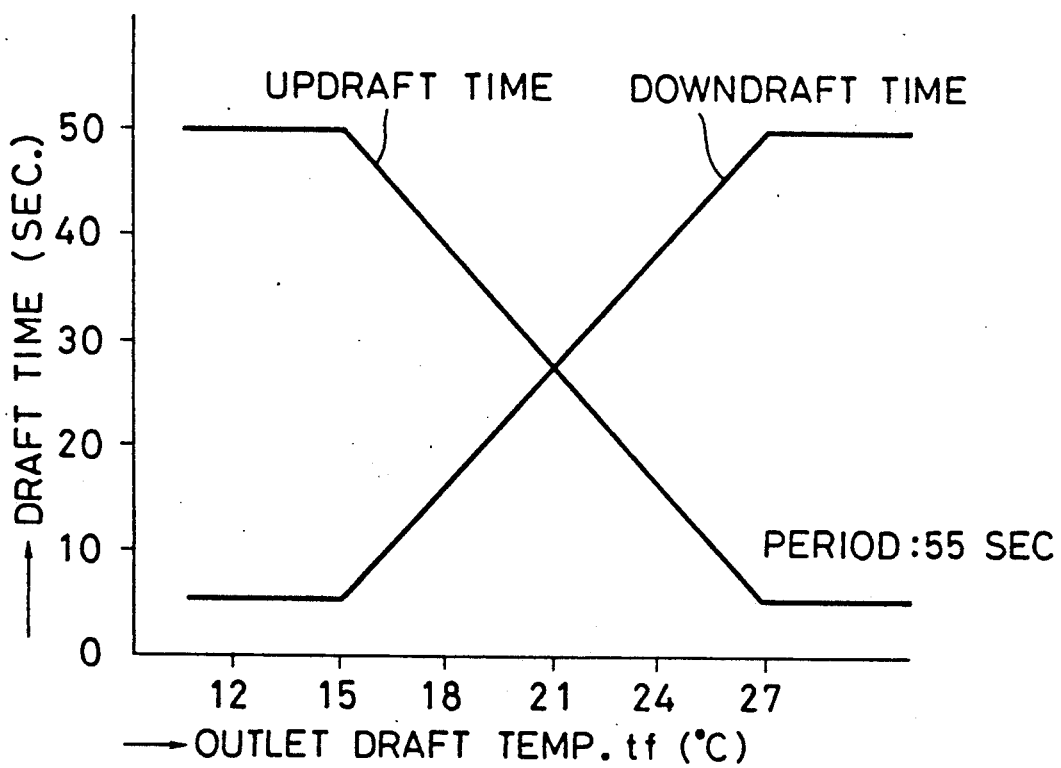
FIG. 14 diagrams characteristics for draft outlet temperature and updraft time.

A third embodiment of the invention will now be described in reference to FIG. 4, FIG. 5, FIG. 6, and FIG. 12 which were used for the description of Embodiment 1, as well as FIG. 13 and FIG. 14. FIG. 13 displays a subroutine flow chart for Step Fsb2 of FIG. 6. FIG. 14 diagrams characteristics for draft outlet temperature and updraft time.

The draft temperature detector 13 of this embodiment detects the temperature at the draft outlet. The calculating means D of this embodiment is similar to that in the Embodiment 1 in that it calculates the parameters defining the motion of the vertically tilting louver, to vary the time that a draft is flowing upward from on outlet in accordance with the temperature of the room heat exchanger, while keeping constant the cycle time that the draft is flowing downward from the outlet owing to an action of a vertically tilting louver.

Taking cooling operation as an example, operation of the third embodiment will now be described in reference to FIG. 13 and FIG. 14.

The operation for controlling the air conditioner is similar to that described in reference to FIG. 6 in connection with Embodiment 1 except the subroutine Fsb2, which will be explained in reference to FIG. 10 primarily with regards to the calculating means D.

When processing branches to the subroutine, a set flag will be checked at Step Fs01; and, if the set flag is raised, i.e., if setting is necessary, processing will branch to Step Fs02; and, if the set flag is not raised, i.e., if setting is not necessary, processing will branch to Step Fs06. Since the set flag was raised in the initialization set routine, at first processing will proceed to Step Fs02. At Step Fs02, draft outlet temperature Tf will be measured, and, at Step Fs03, a downdraft time and an updraft time, both shown in FIG. 14, will be calculated.

FIG. 14 is a control characteristics chart for downdraft time versus draft outlet temperature Tf by action of vertically tilting louver 17. As shown in the figure, when the draft outlet temperature Tf is high, the downdraft time is long; and when the draft outlet temperature Tf is low, the downdraft time is short. A downdraft time corresponding to draft outlet temperature Tf at that time is calculated with this relation. Furthermore, while fixing the period constant, an updraft time is calculated from this calculated downdraft time. The figure shows a case in which the period is 55 seconds long. In Step Fs04, an output of output circuit 11 of microcomputer 5 operates drive circuit 15 and motor 16, which rotate vertically-tilting-louver 17, thereby setting the direction of the outlet draft downward. In Step Fs05, the set flag is lowered (set to 0); and processing returns to the main routine (FIG. 6).

If, at Step Fs01, the set flag has already been lowered (set to 0), processing will proceed to Step Fs06. If draft direction has been set to downward, downdraft time will be counted up at step Fs07. Then, at Step Fs08, the downdraft time (set in Step Fs03) and the downdraft time count (counted up in Step Fs07) will be compared. If downdrafting is not yet complete (i.e., if the downdraft time count is less than the set downdraft time), processing will return to the main routine. If downdrafting is judged as complete at Step Fs08, processing will proceed to Step Fs09; and drive circuit 15 and motor 16 will operate by an output of output circuit 11 of microcomputer 5; and vertically tilting louver 17 will rotate, thereby setting the direction of the outlet draft upward. In Step Fs10, the downdraft time count is reset; and processing returns to the main routine.

If draft direction has been set to upward, processing will branch to Step Fs11 at Step Fs06; and, in a way similar to that for downdraft, an updraft time will be counted up. Then, at Step Fs12, an updraft time (calculated from draft outlet temperature Tf in Step Fs03) and the updraft time count will be compared. If updrafting is not yet complete, processing will return to the main routine. If updrafting is complete, the set flag will be raised (set to 1) at Step Fs13; at Step Fs14, the updraft time count will reset; and processing will return to the main routine. In this way, the subroutine carries out, over a constant period and in a repetitive manner, a downdraft operation and an updraft operation in accordance with a temperature of a draft outlet at that time.

EMBODIMENT 4

Figure 15:
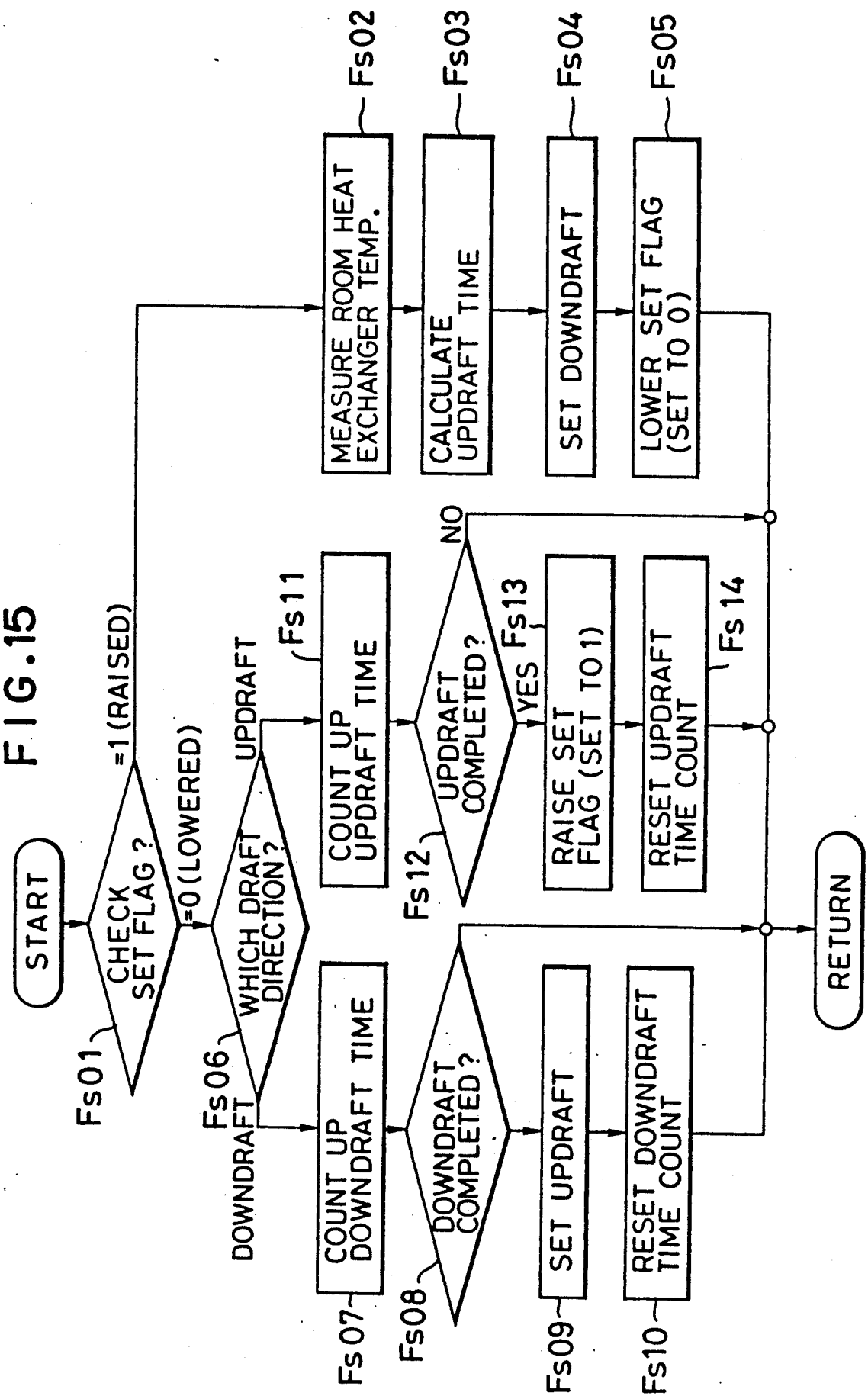
FIG. 15 displays a subroutine flow chart for Step Fsb2 in a fourth embodiment.
Figure 16:
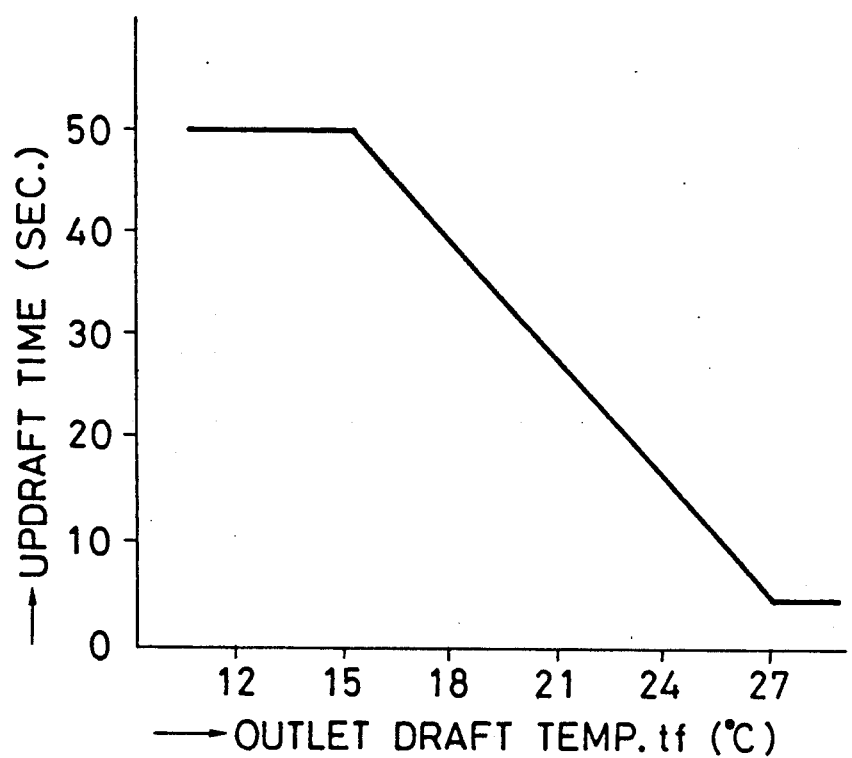
FIG. 16 diagrams, for the fourth embodiment, characteristics for draft outlet temperature and downdraft time.

A fourth embodiment of the invention will now be described in reference to FIG. 4, FIG. 5, FIG. 6, and FIG. 12 which were used for the description of Embodiment 1, as well as FIG. 15 and FIG. 16. FIG. 15 displays a subroutine flow chart for Step Fsb2 of FIG. 6. FIG. 16 diagrams characteristics for draft outlet temperature and updraft time.

The draft temperature detector 13 of this embodiment detects the temperature at the draft outlet. The calculating means D of this embodiment is similar to that in the Embodiment 2 in that it calculates the parameters defining the motion of the vertically tilting louver, to vary the time that a draft is flowing upward from on outlet in accordance with the temperature of the room heat exchanger, while keeping constant the cycle time that the draft is flowing downward from the outlet owing to an action of a vertically tilting louver.

Taking cooling operation as an example, operation of the third embodiment will now be described in reference to FIG. 15 and FIG. 16.

The operation for controlling the air conditioner is similar to that described in reference to FIG. 6 in connection with Embodiment 2 except the subroutine Fsb2, which will be explained in reference to FIG. 15 primarily with regards to the calculating means D.

When processing branches to the subroutine, a set flag will be checked at Step Fs01; and, if the set flag is raised, i.e., if setting is necessary, processing will branch to Step Fs02; and, if the set flag is not raised, i.e., if setting is not necessary, processing will branch to Step Fs06. Since the set flag was raised in the initialization set routine, at first processing will proceed to Step Fs02. At Step Fs02, draft outlet temperature Tf will be measured, and, at Step Fs03, a downdraft time and an updraft time, both shown in FIG. 16, will be calculated.

FIG. 16 is a control characteristics chart for updraft time versus draft outlet temperature Tf by action of vertically tilting louver 17. As shown in the figure, when the draft outlet temperature Tf is high, the updraft time is long; and when the draft outlet temperature Tf is low, the updraft time is short. An updraft time corresponding to draft outlet temperature Tf at that time is calculated with this relation. Furthermore, while fixing the period constant, an updraft time is calculated from this calculated downdraft time. In Step Fs04, an output of output circuit 11 of microcomputer 5 operates drive circuit 15 and motor 16, which rotate vertically-tilting-louver 17, thereby setting the direction of the outlet draft downward. In Step Fs05, the set flag is lowered (set to 0); and processing returns to the main routine (FIG. 6).

If, at Step Fs01, the set flag has already been lowered (set to 0), processing will proceed to Step Fs06. If draft direction has been set to downward, downdraft time will be counted up at step Fs07. This downdraft time is set to be within the range of 5 to 20 seconds in the initialization routine. Then, at Step Fs08, the downdraft time (set in Step Fs03) and the downdraft time count (counted up in Step Fs07) will be compared. If downdrafting is not yet complete (i.e., if the downdraft time count is less than the set downdraft time), processing will return to the main routine. If downdrafting is judged as complete at Step Fs08, processing will proceed to Step Fs09; and drive circuit 15 and motor 16 will operate by an output of output circuit 11 of microcomputer 5; and vertically tilting louver 17 will rotate, thereby setting the direction of the outlet draft upward. In Step Fs10, the downdraft time count is reset; and processing returns to the main routine.

If draft direction has been set to upward, processing will branch to Step Fs11 at Step Fs06; and, in a way similar to that for downdraft, an updraft time will be counted up. Then, at Step Fs12, an updraft time (calculated from draft outlet temperature Tf in Step Fs03) and the updraft time count will be compared. If updrafting is not yet complete, processing will return to the main routine. If updrafting is complete, the set flag will be raised (set to 1) at Step Fs13; at Step Fs14, the updraft time count will reset; and processing will return to the main routine. In this way, the subroutine carries out, in a repetitive manner, a predetermined downdraft operation and an updraft operation in accordance with a temperature of a draft outlet at that time.

In the previous description of the embodiments, a case having a selection switch for changing over between a normal-mode and a change-mode was discussed; however, processing may be carried out with no such switch and while in the change-mode at all times.

Also, in the previous description of the embodiments, a case was discussed in which processing enters the change-mode when room temperature is within a certain range near a set temperature; however, processing may be in the change-mode at all times.

Furthermore, in the previous description of the embodiments, a case of cooling was discussed; however, the same holds true for heating, and a similar effect may be obtained for heating with any air conditioner having an adjustable heating or cooling output.

In the embodiments described, the part of the air conditioner placed in the room is disposed in the upper part of the room and the direction of the draft toward the area where the user is normally staying is downward and the direction of the draft away from the above mentioned area is upward. However, the part of the air conditioner placed inside the room may alternatively be in the lower part of the room and the direction of the draft is toward the above mentioned area is horizontal or upward direction while the direction away from the above mentioned area is downward.

ADVANTAGES

As described above, the invention controls room temperature so that it varies in the vicinity of a set temperature and controls an outlet draft to vary the time the outlet draft comes in contact with the user. As a result, it creates a pleasant and energy-efficient environment to invigorate physical and mental activity by increasing, relative to control methods in which room temperature is changed, the stimulation of temperature receptors on the skin of a user.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air conditioner having an indoor unit placed in a room to be heated or cooled, comprising:
   heating/cooling means that produces heated or cooled air and that has an adjustable heating or cooling output;
   a draft outlet through which the air heated or cooled by said heating/cooling means is passed out of the indoor unit;
   draft directing means, which can assume a first position directing an outlet draft toward a location where a user is normally positioned and a second position directing the outlet draft away from said location;
   room temperature detector means that detects the temperature within the room;
   draft temperature detector means that detects the temperature of the outlet draft;
   output control means, responsive to the detected room temperature, for periodically varying the heating or cooling output of said heating/cooling means so that the room temperature is varied in a vicinity of a set temperature; and
   draft direction control means for controlling said draft directing means to assume said first position and said second position alternately, and for adjusting a proportion of time for which said draft directing means is in said first position, in accordance with the detected outlet draft temperature.

2. The air conditioner according to claim 1, the indoor unit is positioned at the upper part of the room, said draft directing means is a vertically tilting louver, and
   said first position is a position in which said vertically tilting louver is directing the outlet draft downward.

3. The air conditioner according to claim 1, said heating/cooling means is a heat exchanger of a refrigeration cycle.

4. The air conditioner according to claim 1, the outlet draft temperature is detected at said draft outlet.

5. The air conditioner according to claim 1, the outlet draft temperature is detected at said heating/cooling means.

6. The air conditioner according to claim 1, said set temperature is a temperature set by the user.

7. The air conditioner according to claim 1, said draft direction control means adjusts a time for which said draft directing means is in said second direction in accordance with the detected outlet draft temperature, and maintains constant a time for which said draft directing means is in said first direction.

8. The air conditioner according to claim 1, said draft direction control means adjusts a time for which said draft directing means is in said second direction in accordance with said detected draft time, and maintains constant the period with which said draft directing means alternately assumes said first position and said second position.

* * * * *